(12) United States Patent
Soryal

(10) Patent No.: US 11,483,709 B2
(45) Date of Patent: Oct. 25, 2022

(54) AUTHENTICATION TECHNIQUE TO COUNTER SUBSCRIBER IDENTITY MODULE SWAPPING FRAUD ATTACK

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 855 days.

(21) Appl. No.: 16/353,105

(22) Filed: Mar. 14, 2019

(65) Prior Publication Data

US 2020/0296590 A1   Sep. 17, 2020

(51) Int. Cl.

| | |
|---|---|
| *H04W 12/12* | (2021.01) |
| *H04W 12/06* | (2021.01) |
| *H04W 12/00* | (2021.01) |
| *H04W 4/02* | (2018.01) |
| *H04W 8/20* | (2009.01) |
| *H04W 12/122* | (2021.01) |
| *H04W 12/30* | (2021.01) |
| *H04W 12/63* | (2021.01) |

(52) U.S. Cl.
CPC ......... *H04W 12/122* (2021.01); *H04W 4/025* (2013.01); *H04W 8/20* (2013.01); *H04W 12/06* (2013.01); *H04W 12/30* (2021.01); *H04W 12/63* (2021.01)

(58) Field of Classification Search
CPC ..... H04W 12/122; H04W 4/025; H04W 8/20; H04W 12/06; H04W 12/30; H04W 4/02; H04W 12/126; H04W 12/63
See application file for complete search history.

(56) References Cited

U.S. PATENT DOCUMENTS

| | | |
|---|---|---|
| 6,600,916 B1 | 7/2003 | Verstraete |
| 7,860,488 B2 | 12/2010 | Wollersheim et al. |
| 8,442,487 B2 | 5/2013 | Lohtaja et al. |
| (Continued) | | |

FOREIGN PATENT DOCUMENTS

| | | |
|---|---|---|
| CN | 1717103 | 1/2006 |
| CN | 102065405 | 5/2011 |
| (Continued) | | |

OTHER PUBLICATIONS

John Biggs. "SIM swap hacker caught in Florida" Article dated Aug. 9, 2018 from techcrunch.com (pp. 1-3) (Year: 2018).*

(Continued)

*Primary Examiner* — Joseph P Hirl
*Assistant Examiner* — Thomas A Gyorfi
(74) *Attorney, Agent, or Firm* — Amin, Turocy & Watson, LLP

(57) ABSTRACT

Authentication processes to counter subscriber identity module swapping fraud attacks is disclosed. A method can comprise receiving location data representative of a tower device of a group of tower devices; receiving duration data representing a time period during which the mobile device has been traversing through a transmission region monitored by the tower device; as a function of the identification data, the location data, and the duration data, formulating a challenge query for the mobile device to answer; and sending the challenge query to the tower device.

20 Claims, 10 Drawing Sheets

(56) References Cited

U.S. PATENT DOCUMENTS

| | | | |
|---|---|---|---|
| 8,630,620 B2 | 1/2014 | Cha et al. | |
| 8,689,309 B2 | 4/2014 | Saran et al. | |
| 9,942,770 B2 | 4/2018 | Meredith et al. | |
| 9,955,352 B2 | 4/2018 | Mahaffey et al. | |
| 10,064,055 B2 | 8/2018 | Raleigh et al. | |
| 10,178,223 B1 | 1/2019 | Marimuthu | |
| 11,234,128 B2* | 1/2022 | Laarakkers | H04L 63/0428 |
| 2002/0180583 A1 | 12/2002 | Paatero et al. | |
| 2004/0015692 A1 | 1/2004 | Green et al. | |
| 2010/0311468 A1* | 12/2010 | Shi | H04W 4/50 455/558 |
| 2014/0172712 A1 | 6/2014 | Petersen et al. | |
| 2016/0021532 A1 | 1/2016 | Schenk et al. | |
| 2016/0066189 A1* | 3/2016 | Mahaffey | H04M 15/7652 455/405 |
| 2016/0224970 A1 | 8/2016 | Pama | |
| 2019/0069125 A1* | 2/2019 | Ravichandran | H04L 67/2842 |
| 2019/0199530 A1* | 6/2019 | Reitsma | H04W 12/084 |
| 2019/0223003 A1* | 7/2019 | Balasubramanian | H04W 8/183 |
| 2020/0169879 A1* | 5/2020 | Linton | H04W 12/02 |

FOREIGN PATENT DOCUMENTS

| | | |
|---|---|---|
| CN | 101572889 | 11/2011 |
| CN | 102625296 | 8/2012 |
| CN | 101848462 | 12/2012 |
| CN | 101938746 | 3/2014 |
| DE | 19818846 | 11/1999 |
| WO | 0024218 | 4/2000 |
| WO | 2005032195 | 4/2006 |
| WO | 2006064359 | 6/2006 |
| WO | 2011153897 | 12/2011 |
| WO | 2012000293 | 1/2012 |
| WO | 2012088661 | 7/2012 |

OTHER PUBLICATIONS

Marinoff. "Investor Lawsuit Brought Against AT&T, T-Mobile for SIM Swapping Hacks" Bitcoin magazine Nov. 9, 2018.

"Protecting Against Mobile Fraud and Attacks: Complete Visibility of Individual Attack Vectors" ThreatMetrix Solution Brief (2017).

Jordann et al.,"A biometrics-based solution to combat SIM swap fraud." Open Research Problems in Network Security, Springer, Berlin, Heidelberg, 2011. 70-87.

Racic, et al.,"Exploiting MMS Vulnerabilities to Stealthily Exhaust Mobile Phone's Battery" SecureComm, vol. 6, 2006. http://citeseerx.ist.psu.edu/viewdoc/download?doi=10.1.1.435.6185&rep=rep1&type=pdf.

Al-Fayoumi et al.,"Cloning sim cards usability reduction in mobile networks." Journal of network and systems management 22.2 (2014): 259-279.

Lin et al.,"Potential fraudulent usage in mobile telecommunications networks." IEEE Transactions on Mobile Computing 99.2 (2002): 123-131.

* cited by examiner

AUTHENTICATION TECHNIQUE TO COUNTER SUBSCRIBER IDENTITY MODULE SWAPPING FRAUD ATTACK

TECHNICAL FIELD

The disclosed subject matter provides authentication techniques to counter subscriber identity module swapping fraud attacks.

BACKGROUND

Subscriber identity modules (SIMs) are typically associated with unique identifier values and are used by mobile devices, such as smart phones, cellular devices, and the like to provide a unique identifier value that can be used by mobile network operator (MNO) entities to associate the mobile device with a mobile network operator entity. SIMs generally can store data such as password information that can be used to access various facilities and/or functionalities associated with membership with a MNO (e.g., telephonic capabilities, messaging capabilities, . . . ). Additionally, SIMs can be utilized to provide access to other facilities and/or functionalities offered, for example, by banking institutions, social networking websites, vendor/shopping sites, and the like, wherein security details stored to the SIM and needed to access such facilities and/or functionalities are generally required.

SIM swapping occurs when a bad actor, such as a hacker, gather security details on a victim, such as mobile device password, responses to security questions, and the like. With such security details a bad actor can contact an MNO claiming that the SIM associated with the mobile device has become nonoperational, lost, or damaged (e.g., become non-functional) and requesting that a new SIM be activated. Once the new SIM has been obtained, the bad actor can gain access to the victim's personal, security, and financial information.

DETAILED DESCRIPTION

Figure 1:
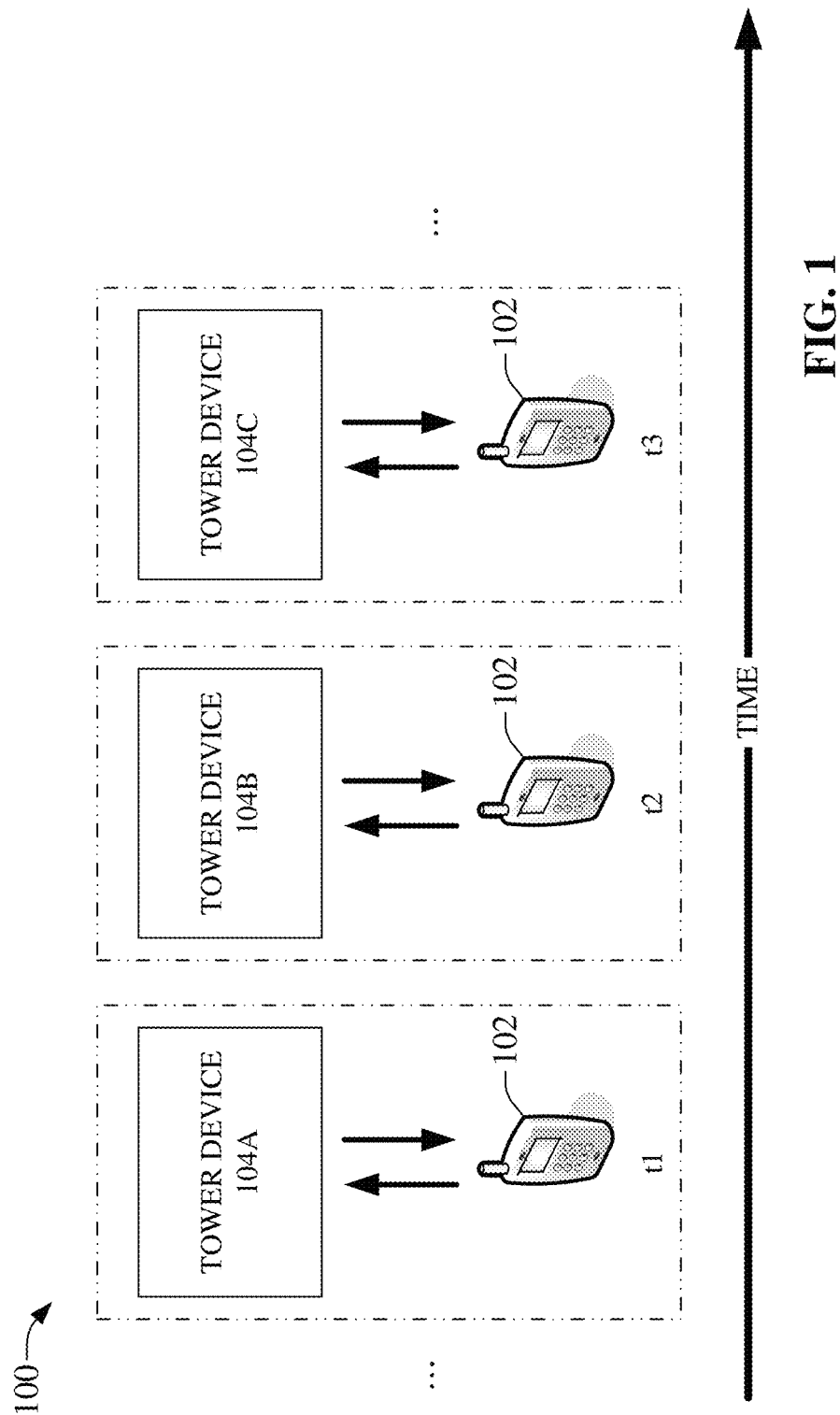
FIG. 1 is an illustration of a system that counters subscriber identification module swapping fraud attacks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, or device comprising: a processor, and a memory that stores executable instructions that, when executed by the processor, facilitate performance of operations. The operations can comprise determining that an entry of the device into a broadcast area controlled by a network device of a group of network devices; based on the entry, sending identifier data associated with a subscriber identification module representing the device to the network device; and facilitating a response, to be undertaken by the network device, the response comprising location data representing a location of the network device.

Further operations can comprise storing the location data to a microservice associated with an operating system executing on the device, and when the response is a first response facilitating a second response, to be undertaken by the network device, comprising timestamp data representative a time duration determined as a function of the entry of the device into the broadcast area controlled by the network device and an exit of the device from the broadcast area controlled by the network device. Additional operations can comprise storing the time duration to a microservice associated with an operating system executing on the device. When the network device is a first network device the operations can comprise facilitating storing of the identifier data and the location data to a second network device. When the network device is a first network device and the operations can further comprise facilitating a second network device to generate a challenge query based on the identifier data, the location data, and timestamp data indicative of a time duration during which the device has tracked through the broadcast area; facilitating the second network device to send the challenge query to the device; and responding to the challenge query with the location data and the timestamp data stored to a microservice associated with an operating system executing on the device.

In accordance with further embodiments, the subject disclosure describes a method and/or process, comprising a series of acts that can include: detecting, by a device comprising a processor, that a mobile device has entered a transmission area controlled by the device; in response to the detecting (or in response to the entry), receiving, by the device, identifier data associated with a subscriber identification module representing the mobile device; and facilitating, by the device, transmitting location data representing a location of the device to the mobile device.

When the device is a first device, the acts further comprise facilitating, by the first device, storage of the identifier data and the location data to a record of database records maintained by a second device; facilitating, by the first device, the second device to generate a challenge query based on the identifier data, the location data, and timestamp data indication of a time duration during which the mobile device has tracked through the transmission area; and facilitating, by the first device, the mobile device to respond to the challenge query based on the location data and the timestamp data, wherein the timestamp data and the location have been stored to a microservice associated with an operating system executing on the mobile device.

In accordance with the foregoing the location data comprises global positioning satellite coordinate data, the first device is a network device of a grouping on network devices, the second device is a core network device of a collection of core network devices, and/or the second device is an edge network device of a collection of edge network devices.

In accordance with still further embodiments, the subject disclosure describes a machine readable storage medium, a computer readable storage device, or non-transitory machine readable media comprising instructions that, in response to execution, cause a computing system comprising at least one processor to perform operations. The operations can include: receiving identification data representing a subscriber identification module associated with a mobile device; receiving location data representative of a location of a tower device of a group of tower devices; receiving duration data representing a time period during which the mobile device has been traversing through a transmission region monitored by the tower device; as a function of the identification data, the location data, and the duration data, formulating a challenge query for the mobile device to answer; and sending the challenge query to the tower device.

When the location data is first location data and the duration data is first duration data, and the operations further comprise facilitating the mobile device to respond to the challenge query based on second location data and second duration data, wherein the second duration data and the second location data are received from the tower device; determining whether the first duration data matches the second duration data, and whether the first location data matches the second location data; and in response to a first match of the first duration data with the second duration data and a second match of the first location data with the second location data, allowing a network service to be operational on the mobile device.

Now with reference to the Figures, FIG. 1 illustrates a system 100 that counters SIM swapping fraud attacks in accordance with various embodiments. System 100 can include mobile device 102 (e.g., user equipment device or user device such as cell phone device, smart phone device, portable device, personal digital assistant device, tablet device, . . . ) that can be in operable wireless (and/or wired) communication with first tower device 104A. Tower device 104A (and tower device 104B, tower device 104C, . . . ) can be a device with which mobile device 102 can be in communication with while mobile device 102 is traveling from a first point (e.g., a user's residence) to a second point (e.g., the user's place of work). Thus, as illustrated mobile device 102 in timeframe t1 can be in communication with first tower device 104A. Further, as also depicted, mobile device 102 in timeframe t2 can be in communication with second tower device 104B. Additionally, as is also shown, mobile device 102 in timeframe t3 can be in communication with third tower device 104C. Tower device 104A, tower device 104B, and tower device 104C can comprise a grouping of tower devices maintained and/or controlled by one or more mobile network operator (MNO) entity. While mobile device 102 is respectively in communication with tower device 104A, tower device 104B, tower device 104C, etc., each tower device of the grouping of tower devices (e.g., tower device 104A, tower device 104B, tower device 104C, etc.) can respectively exchange information with mobile device 102 when mobile device 102 is within the coverage ambit provided by each tower device 104.

For instance in time frame t1, while mobile device 102 is within the transmission purview of tower device 104A, tower device 104A can receive, from mobile device 102, pertinent data in relation to mobile device 102. Such data can represent a unique value associated with a subscriber identification module (SIM) included in mobile device 102 that can indicate to tower device 104A that mobile device 102 is a member or subscriber of a MNO entity. Additional data that can be communicated by mobile device 102 to tower device 104A can comprise quality of service (QoS) data, location data representing global positioning system (GPS) data associated with a current location of mobile device 102 within the transmission coverage umbrella provided by tower device 104A, and the like.

At time frame t1, while mobile device 102 is traveling through the transmission coverage area afforded by tower device 104A, tower device 104A can send data to mobile device 102. Data transmitted to mobile device 102 by tower device 104A, for instance, can comprise unique identifier values associated with tower device 104A, time stamp data, duration of contact data representing a duration time value that measures the period during which mobile device 102 is/was within the transmission coverage area controlled by tower device 104A prior to mobile device 102 being handed over to another tower device, such as tower device 104B in time frame t2. Additional data that can be sent from tower device 104A to mobile device 102 can also include nonce string data that can be generated by functionalities and/or facilities associated with tower device 104A. The nonce string data can be a unique random string of values of random length that can be generated as a function of the unique identifier values associated with tower device 104A, values sent by mobile device 102 and associated with the unique value associated with the SIM included in mobile device 102, and data (e.g., time stamp data, location data, duration of contact data, nonce string data, and the like) associated with a defined number (or grouping) of one or more tower devices that mobile device 102 can have been in communication within a defined recent past (e.g., within the last hour, last day, last week, last fortnight, etc.). Further data that can also be communicated by tower device 104A to mobile device 102 can include data representing cryptographic key data unique to a temporal contact between the tower device (e.g., tower device 104A) and mobile device 102. In regard to the data representing cryptographic key data unique to the temporal contact between the tower device and mobile device 102, the cryptographic key data can change as a function of time. For instance, the first time that mobile device 102 and a tower device (e.g., tower device 104A) are in communication with one another in an initial time frame, the cryptographic key unique to the instance of temporal contact can be an exchange of first cryptographic key data, the next and subsequent times thereafter that mobile device 102 comes within the broadcast coverage of the tower device (e.g., tower device 104A) the cryptographic key unique to the next instance of temporal contact can be an exchange of subsequent cryptographic key data, wherein the first cryptographic key data and the subsequent cryptographic key data can be uniquely distinguishable and distinct.

Additional data that can be communicated by tower device 104A to mobile device 102 can comprise location data associated with tower device 104A. The location data can represent the GPS coordinate, latitude data, longitude data, and/or geo-tag location data.

When mobile device 102 transitions to the respective transmission coverage areas circumscribed by tower device 104B and/or tower device 104C in time frames t2 and t3, a similar grouping of data as detailed above in regard to the interactions between tower device 104A and mobile device 102 in the context of time frame t1 can be interchanged between mobile device 102 and tower devices 104B and 104C.

Thus, in time frame t2 when mobile device 102 enters into the coverage area provided by tower device 104B, mobile device 102 and tower device 104B can establish communications with one another by exchanging data comprising, for instance, subscriber data associated with a SIM that can be included in or associated with mobile device 102, unique identification data associated with tower device 104B, QoS data for each of mobile device 102 and/or tower device 104B, location data such as GPS coordinates (or longitudinal and/or latitudinal coordinates, geo-location codes, etc) for each of mobile device 102 and/or tower device 104B, and the like.

Further data that can be sent by tower device 104B to mobile device 102 while mobile device 102 is under the control and/or within the transmission umbrae (and/or transmission penumbrae) of tower device 104B can include time stamp data (e.g., first time stamp data associated with when mobile device 102 entered the transmission umbrae/penumbrae associated with tower device 104B and/or second time stamp data associated when mobile device 102 exited the transmission umbrae/penumbrae provided tower device 104B). Additionally and/or alternatively, tower device 104B can just convey to mobile device 102 first time stamp data pertaining to when mobile device 102 entered the broadcast area and/or initiated contact with tower device 104B, thereby allowing mobile device 102 to determine a duration during which mobile device 102 is/was within the transmission space controlled by tower device 104B. Mobile device 102 can determine the duration by comparing the first time stamp data pertaining to when mobile device 102 entered the broadcast area and/or initiated contact with tower 104B with time stamp data associated with when mobile device 102 enters and/or establishes contact with another tower device (e.g., tower device 104C). Alternatively and/or additionally, tower device 104B can just convey to mobile device 102 second time stamp data pertaining to when mobile device 102 exits the broadcast area controlled by tower device 104B and/or relinquishes contact with tower device 104B. In this instance, mobile device 102 can determine the duration during which it has occupied the broadcast area controlled by tower device 104B by comparing the second time stamp data relating to when mobile device 102 exited the broadcast area of tower device 104B and/or relinquishes contact with tower device 104B with a timestamp associated with when mobile device 102 relinquished contact with, and/or exited the transmission coverage zone provided by, another tower device (e.g., tower device 104A).

Other data that can be conveyed to mobile device 102 by tower device 104B can include nonce string data representing a unique random string of values. The unique random string of values can be of random length and can be generated based on, for example, subscriber data associated with a SIM associated with mobile device 102; unique identification data associated with tower device 104B; QoS data associated with each of mobile device 102 and/or tower device 104B; location data such as GPS coordinates (or longitudinal and/or latitudinal coordinates, geo-location codes, etc) associated with each of mobile device 102 and/or tower device 104B; . . . . Still yet other data that also be provided to mobile device 102 by tower device 104B can include temporally and/or uniquely distinguishable cryptographic key data (e.g., the cryptographic key data is generated based, for example, on at least time data (and/or in combination with other data) and typically, with a high degree of probability, will not be generated, replicated, and/or utilized by another other device within the MNO carrier network).

Figure 2:
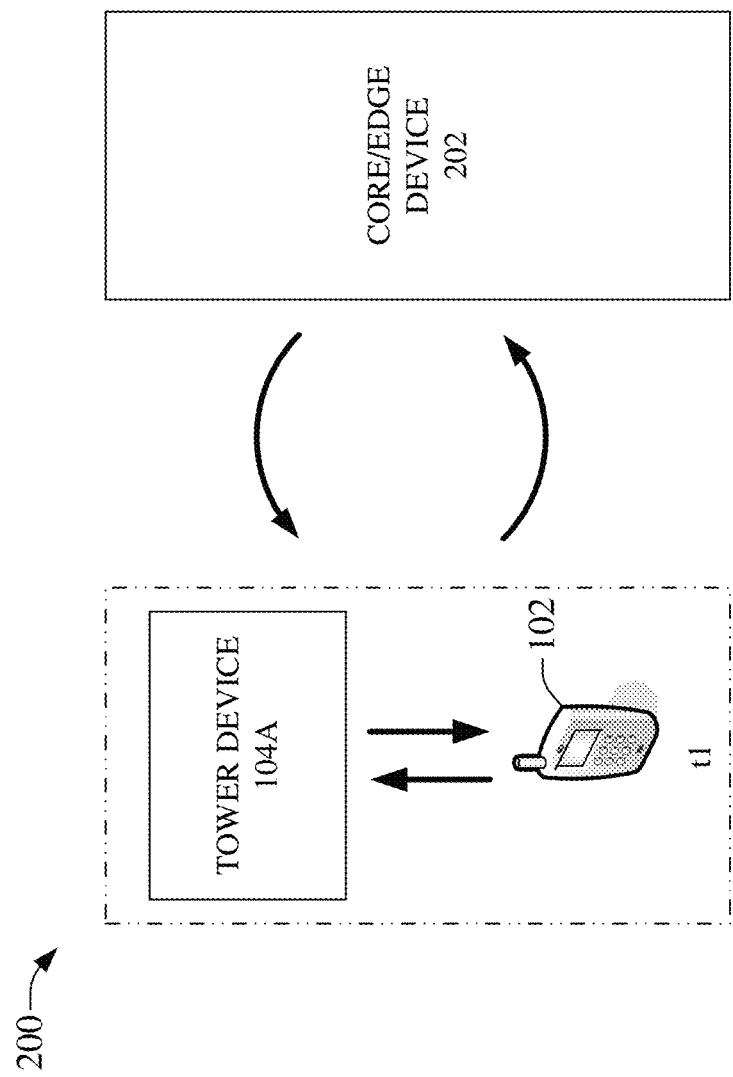
FIG. 2 is a further depiction of a system that counters subscriber identification module swapping fraud attacks, in accordance with aspects of the subject disclosure.

With reference to FIG. 2, illustrated therein is system 100, now referenced as system 200, that counters SIM swapping fraud attacks in accordance with one or more embodiments. System 200 can include tower device 104A that can be in operative communication with core/edge device 202. It will be noted that while tower device 104A is depicted as being in operative communication with core/edge device 202, other tower devices (e.g., tower device 104B, tower device 104C, . . . ) can also be in operative communication with core/edge device 202. As illustrated, tower device 104A can communicate with core/edge device 202 when mobile device 102 has exited the broadcast coverage area controlled by tower device 104A. Tower device 104A can send to core/edge device 202 data relating to subscriber data associated with a SIM associated with mobile device 102, location data associated with tower device 104A and/or location data associated with mobile device 102, nonce string data that can have been generated and supplied to mobile device 102 by tower device 104A, and cryptographic key data that can have been generated by tower device 102 and supplied to mobile device 102. As noted above, the cryptographic key data can be temporally and/or uniquely distinguishable from any other cryptographic key data since it can be generated based at least on time stamp data (and/or in combination with other pertinent data). Additionally, tower device 104A can also send time stamp data that can indicate a time at which mobile device 102 entered a transmission region controlled by tower device 104A and/or time stamp data indicative of a time at which mobile device 102 exited the transmission region controlled by tower device 104A. Core/edge device 202 based on the time stamp data can determine a duration during which mobile device 102 was within the transmission coverage region associated with tower device 104A. Additionally and/or alternatively, core/edge device 202 can receive the duration data from tower device 104A.

Core/edge device 202 can store the data received from tower device 104A pertaining to the interaction tower device 104A had with mobile device 102 to a data structure—a record of database records, such as linked lists, tree structures, clusters of database records, arrays, tables, . . . . The record of database records can be indexed, for example, as a function the subscriber data associated with the SIM included with mobile device 102, wherein the subscriber data can have been obtained by tower device 104A and forwarded by tower device 104A to core/edge device 202.

Core/edge device 202, in response to receiving data in regard to mobile device 102 from tower device 104A, can perform additional authentication steps (e.g., beyond typical SIM authentication) by challenging, via the facilities and/or functionalities provided by tower device 104A, mobile device 102. In accordance with one or more embodiments, core/edge device 202 can generate, based on a record of database records as indexed as a function of the subscriber data associated with mobile device 102, challenge questions regarding random time periods (e.g., one or more of timeframe t1, timeframe t2, timeframe t3, . . . ). For instance, core/edge device 202 can request that mobile device 102 respond, via the present tower device with which mobile device 102 is currently in operable communication, to a query to list the successive GPS location(s) values of the one or more tower devices (e.g., tower device 104A, tower device 104B, tower device 104C) that mobile device 102 has been in contact with within a defined or definable period of time.

Additionally and/or alternatively, core/edge device 202 can also request that mobile device 102, in addition to providing a list of successive GPS location(s) values for tower devices that mobile device 102 has been in communication with, provide one or more additional detail, such as the nonce string (or parts thereof) that can have been generated and transmitted by one or more tower device to mobile device 102 while mobile device 102 was within the broadcast umbrae/penumbrae of the one or more tower device. In this regard it should be noted that core/edge device 202 can request from mobile device 102 that mobile device 102 return an encrypted nonce string (or parts thereof), wherein the nonce string (or parts thereof) can have been generated and transmitted to mobile device 102 by a first tower device (e.g., tower device 104A) during a first duration (as indicated by first time stamp data received from the first tower device), and the encryption key data used by mobile device 102 to encrypt the nonce string (or parts thereof) can have been communicated to mobile device 102 by a second tower device (e.g., tower device 104B) during a second duration (as indicated by second time stamp data received from the second tower device).

In accordance with one or more embodiments, core/edge device 202 can request that mobile device 102 return a listing of GPS coordinates associated with the one or more tower device of a first grouping of tower devices that mobile device 102 has been in contact within a first definable or first defined time period. Core/edge device 202 can encrypt the request (e.g., for mobile device 102 to respond with a listing of GPS coordinates associated with tower devices in a first grouping of tower devices) using first encryption keys that can have been conveyed to mobile device 102 by a tower device associated with a second grouping of tower devices that mobile device 102 has been in contact within a second definable or second defined period of time. Additionally, core/edge device 202 can also direct, in the request to mobile device 102, mobile device 102 to encrypt any reply to the request (e.g., the listing of GPS coordinates associated with the one or more tower device of a first grouping of tower devices that mobile device 102 has been in contact within the first definable or first defined time period) using second encryption keys that can have been conveyed to mobile device 102 by a tower device associated with a third grouping of tower devices with which mobile device 102 has been in contact with in a third definable or third defined period of time.

Figure 3:
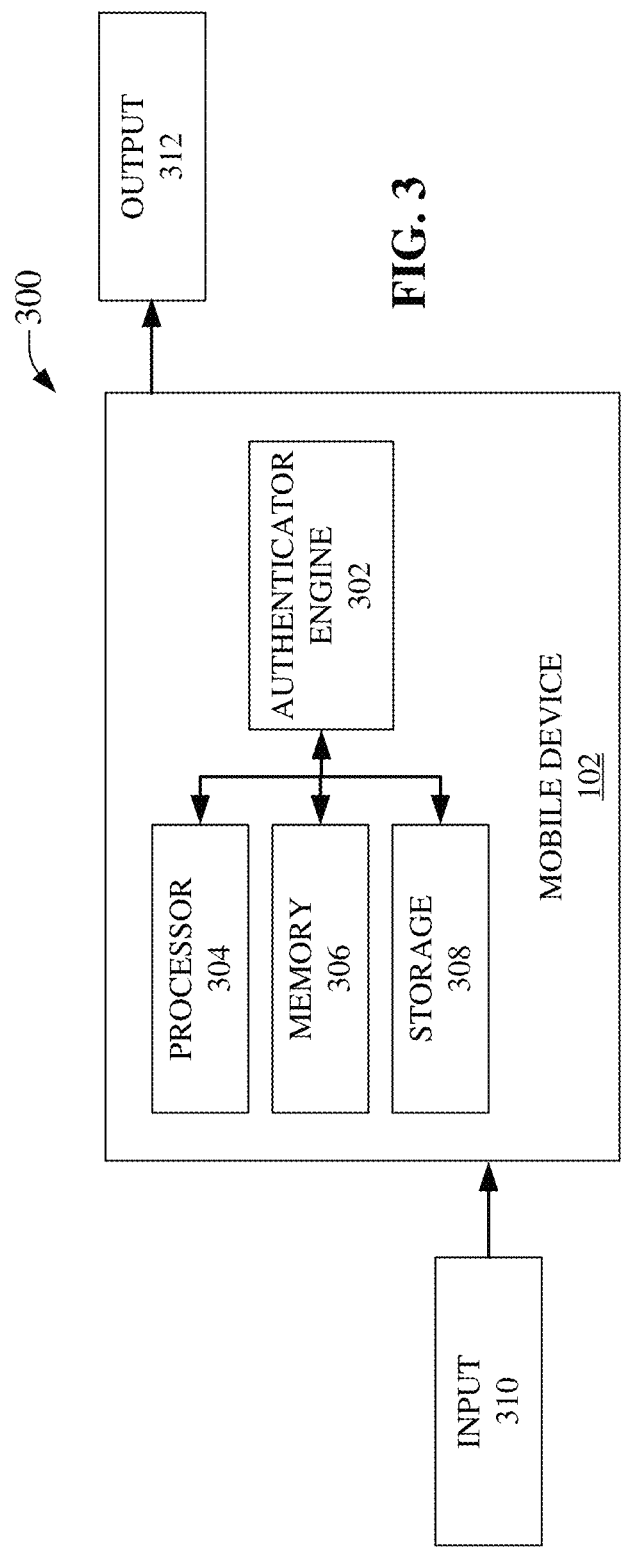
FIG. 3 provides illustration of an additional system that counters subscriber identification module swapping fraud attacks, in accordance with aspects of the subject disclosure.

FIG. 3 provides illustration of mobile device 102, now referred to as system 300, for countering SIM swapping fraud attacks, in accordance with various further disclosed embodiments. System 300 can comprise authenticator engine 302 that can be communicatively coupled to processor 304, memory 306, and storage 308. Authenticator engine 302 can be in communication with processor 304 for facilitating operation of computer or machine executable instructions and/or components by authenticator engine 302, memory 306 for storing data and/or the computer or machine executable instructions and/or components, and storage 308 for providing longer term storage of data and/or machine and/or computer executable instructions. Additionally, system 300 can also receive input 310 for use, manipulation, and/or transformation by authentication engine 302 to produce one or more useful, concrete, and tangible result and/or to transform one or more articles to different states or things. Further, system 300 can also generate and output the useful, concrete, and tangible result and/or the transformed one or more articles produced by authentication engine 302 as output 312.

As will have been observed from the foregoing, system 300 can be any type of mechanism, machine, device, facility, and/or instrument that includes a processor and/or is capable of effective and/or operative communication with a network topology. Mechanisms, machines, devices, facilities, and/or instruments that can comprise system 300 can include tablet computing devices, handheld devices, server class computing machines and/or databases, laptop computers, notebook computers, desktop computers, cell phones, smart phones, consumer appliances and/or instrumentation, industrial devices and/or components, personal digital assistants, multimedia Internet enabled phones, multimedia players, aeronautical/avionic devices associated with, for instance, orbiting satellites and/or associated aeronautical vehicles, and the like.

Authenticator engine 302 can initiate communication with a tower device (e.g., tower device 104A . . . tower device 104C) when mobile device 102 (e.g., system 300) enters an area controlled and maintained by the tower device by sending, as output 312, data comprising at least a unique value that can have been obtained from a SIM associated with system 300. Additional data that can be forwarded by system 300 to the tower device while establishing data interchange between the two devices can include quality of service (QoS) metrics, location data representing global positioning system (GPS) data associated with a current location of system 300 within the transmission coverage umbrella provided by the tower device, and the like.

In response to initiating communication with the tower device, system 300, and in particular authenticator device 302, can receive as input 310, data comprising unique identifier values associated with the tower device, time stamp data, duration of contact data representing a duration time value that measures the period during which system 300 is/was within the transmission coverage area controlled by the tower device prior to system 300 being handed over to another tower device. Additional data that can also be sent by the tower device to system 300 can also include nonce string data that can be generated by the tower device. The nonce string data can be a string of alphanumeric values of random length that can be generated as a function, for instance, of unique identifier values associated with the tower device (and/or other MNO devices, such as core/edge device 202), the unique identifier value associated with system 300 (e.g., the unique value associated with the SIM associated with mobile device 102), and/or other data such as time stamp data, location data, duration of contact data, etc. associated with system 300. Additionally and/or alternatively, the nonce string data that can be sent by tower device to system 300 can be determined as a function of unique identifier values associated with the tower device, the unique identifier values associated with system 300, and/or other data such as time stamp data, location data, duration of contact data, etc. associated with groupings of tower devices that system 300 can have been in contact with within disparate time frames.

System 300 can also receive, from the tower device with which it has established data interchange, data representative of cryptographic key data that can be based on (or determined as a function of) the temporal contact between system 300 and the tower device. The cryptographic key data can be determined by the tower device and sent to system 300. Additional data that can be supplied by the tower device to system 300 can include GPS coordinate data, latitude data, longitude data, and/or geo-location tag data, as well as time stamp data (or duration data indicative of a duration during which system 300 has been located within the transmission umbrae/penumbrae cast by the tower device).

Without limitation or loss of generality it should be noted that the data that system 300 receives from the tower device, in the context of this disclosure, can be persisted to one or more embedded microservices that can be associated with one or more operating system operational and/or executing on system 300. Further, the data received by system 300 from the tower device, for purposes of this disclosure, can also be stored to memory 306 and/or storage 308.

In regard to the foregoing one or more embedded microservices can monitor a memory device(s) (e.g., memory 306 and/or storage 308) that can store encrypted credential data. Every time the memory device is accessed, a value of a hash associated with the encrypted credential data and/or the memory device(s) can be changed based on a mechanism, such as an equation, between system 300 (e.g., mobile device 102) and one or more core/edge devices that can comprise a MNO carrier radio access network. Thus, when system 300 is first registered as being associated as being a member device of the MNO carrier radio access network, one or more core/edge devices associated with the MNO carrier radio access network can generate and supply, to system 300, one or more formula with which system 300 can use to encrypt its associated memory device(s) and/or the credential data persisted to the associated memory device(s). For example, the one or more core/edge devices can generate and facilitate storage on system 300 of a computationally simple formula such as: $Y=X+1$, that can be used in instances where the credential data stored to the associated memory storage device(s) do not warrant complex security protection. Additionally and/or alternatively, the one or more core/edge devices can generate and facilitate storage on system 300 of a more computationally complex formula such as: $Y=X^a+X^b+X^c$, for instance where the credential data stored to the associated memory storage device(s) warrant highly complex security protection (e.g., mobile devices associated with national security applications, and the like). In the context of the foregoing formulae, X can represent the existing stored credential data (or hash value of the stored credential data), Y can represent a new value that one of the one or more core/edge devices will expect, and a, b, and c can represent one or more integer values greater than zero (0).

Further, the one or more core/edge devices will be cognizant to the number of times credential data on system 300 (e.g., mobile device 102) has been accessed and as such can adjust the expected credential data accordingly. Further, both system 300 (e.g., mobile device 102) and the one or more core/edge devices can track the location of copied credential data (in case of local back up) and generally will not trigger a trigger changing process, unless the credential data is extracted externally by monitoring the exit routes/interfaces from system 300 during a copying process. In the foregoing manner, if a malefactor clones system 300 (e.g., mobile device 102) they will access the memory device(s) storing the credential data. Thus the next time that the one or more core/edge devices facilitates a check of the authenticity of system 300 based on a reply from system 300, the one or more core/edge devices can determine that there is a mismatch between the data that the one or more core/edge devices can have persisted to a record of database records associated with system 300 and the response that system 300 can have fed back to the one or more core/edge devices.

Figure 4:
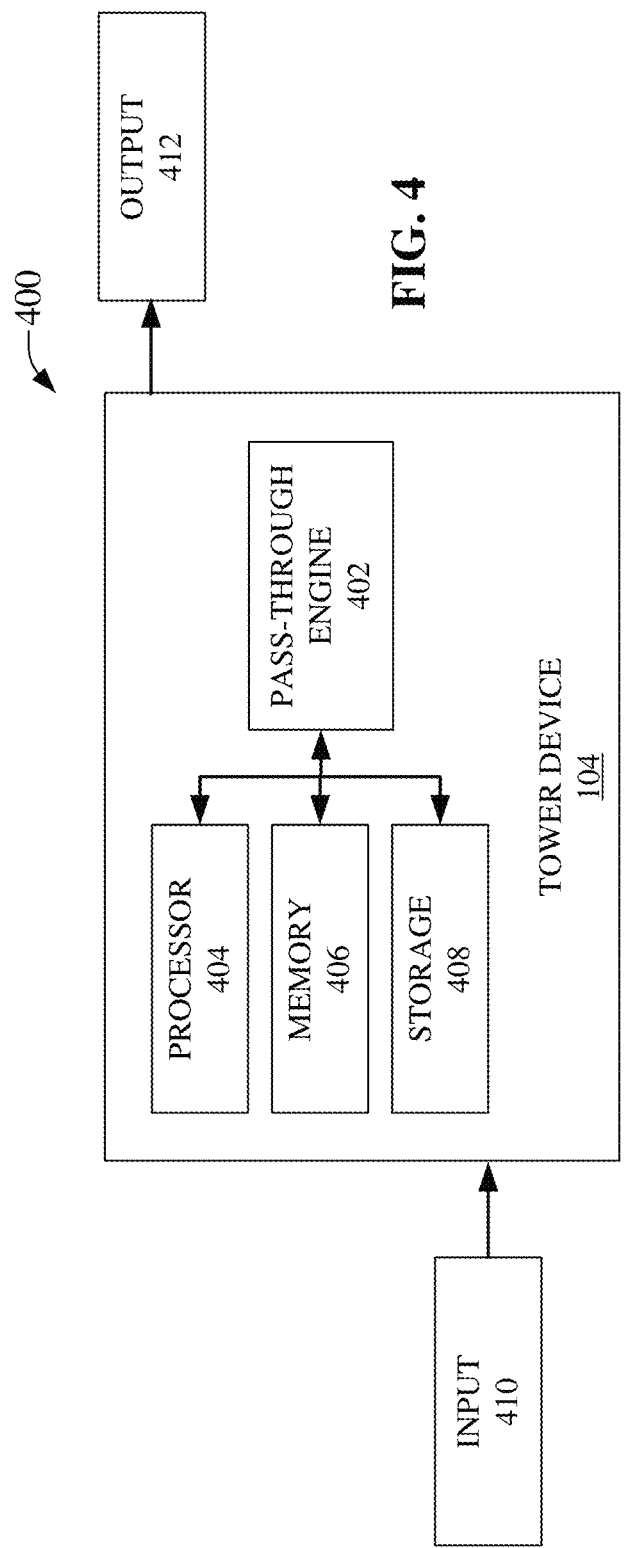
FIG. 4 provides another illustration of a system that counters subscriber identification module swapping fraud attacks, in accordance with aspects of the subject disclosure.

FIG. 4 provides additional depiction of tower device 104, now referred to as system 400, for countering SIM swapping fraud attacks in accordance with various additional embodiments. System 400 can include pass-through engine 402 that can be communicatively coupled to processor 404, memory 406, and storage 408. Pass-through engine 402 can be in communication with processor 404 for facilitating operation of computer or machine executable instructions and/or components by pass-through engine 402, memory 406 for storing data and/or the computer or machine executable instructions and/or components, and storage 408 for providing longer term storage of data and/or machine and/or computer executable instructions. Additionally, system 400 can also receive input 410 for use, manipulation, and/or transformation by pass-through engine 402 to produce one or more useful, concrete, and tangible result and/or transform one or more articles to different states or things. Further, system 400 can also generate and output the useful, concrete, and tangible result and/or the transformed one or more articles produced by pass-through engine 402 as output 412.

System 400 can be any type of mechanism, machine, device, facility, and/or instrument that includes a processor and/or is capable of effective and/or operative communication with a network topology. Mechanisms, machines, devices, facilities, and/or instruments that can comprise system 400 can include tablet computing devices, handheld devices, server class computing machines and/or databases, laptop computers, notebook computers, desktop computers, cell phones, smart phones, consumer appliances and/or instrumentation, industrial devices and/or components, personal digital assistants, multimedia Internet enabled phones, multimedia players, aeronautical/avionic devices associated with, for instance, orbiting satellites and/or associated aeronautical vehicles, and the like.

Pass-through engine 402 can determine that mobile device 102 has entered a transmission/broadcast region controlled by system 400. Further pass-through engine 402 can receive data comprising at least a unique value that can have been obtained from a SIM associated mobile device 102. Pass-through engine 402 can also receive additional data forwarded by mobile device to system 400 while data interchange between the mobile device 102 and system 400 is being established. The additional data can comprise QoS data, location data representing GPS data associated with a current location of mobile device 102 within the transmission coverage umbrella provided by system 400, and the like.

Once communication between system 400 and mobile device 102 has been established, pass-through engine 402 can generate and/or transmit to mobile device 102 data comprising unique identifier values associated with the system 400, time stamp data, duration of contact data representing a duration time value that measures the period during which mobile device 102 is/was within the transmission coverage area controlled by system 400 prior to mobile device 102 transitioning to a transmission coverage of a disparate tower device. System 400 can further generate and send additional data such as nonce string data. Nonce string data can be generated by pass-through engine 402 as a string of alphanumeric values of random length. Pass-through engine 402 can generate the nonce string based on, for example, unique identifier values associated with system 400 (and/or one or more other MNO devices, such as core/edge device 202), the unique identifier value associated with mobile device 102 (e.g., values associated with the SIM associated with mobile device 102), and/or data comprising time stamp data, location data, duration of contact data, etc. associated with mobile device 102. Additionally and/or alternatively, the nonce string data that can be sent to mobile device 102 by system 400 can be determined by pass-through engine 402 as a function of unique identifier values associated with system 400, unique identifier values associated with mobile device 102, and/or other data such as time stamp data, location data, duration of contact data, etc. associated with groupings of tower devices that mobile device 102 can have been in communication with within one or more disparate and definable/definable time frames.

Pass-through engine 402 can also convey to mobile device 102, while mobile device 102 and system 400 are in communication, data representative of cryptographic key data that can be based on (or determined as a function of) the temporal contact between mobile device 102 and system 400. The cryptographic key data can be determined by pass-through engine 402 and sent to mobile device 102.

Additional data that can be supplied by pass-through engine 402 to mobile device 102 can include GPS coordinate data, latitude data, longitude data, and/or geo-location tag data, time stamp data, duration data indicative of a duration during which mobile device 102 has been located within the transmission umbrae/penumbrae cast by system 400.

Pass-through engine 402, though facilities and/or functionalities furnished by system 400, can also be in operable communication with one or more core/edge devices (e.g., core/edge device 202), wherein pass-through engine 402 can facilitate the storage of, by the one or more core/edge devices, data collected from mobile device 102 by pass-through engine 402 pertinent to the contact that mobile device 102 can have had with system 400. The data that can be sent to, and stored by, the one or more core/edge devices can, for example, comprise: SIM related data such as a unique values that identify mobile device 102 as being associated with a MNO carrier radio access network (RAN), unique values that identify system 400 has being an infrastructure device (e.g., base station device, eNodeB device, gNodeB device, . . . ) and associated with a MNO carrier RAN; geographic location data related to mobile device 102 (e.g., tracking history data that tracks mobile device 102 as mobile device 102 transitions, from first entry to last exit, through the transmission area(s) monitored and/or controlled by system 400); and geographic location data pertaining to a geographic location of system 400 (e.g., tower device) and/or the geographic coverage area(s) circumscribed by one or more broadcast antenna(s) and/or one or more receive antenna(s) associated with system 400.

Pass-through engine 402 can also convey to the one or more core/edge devices, and facilitate storage by the one or more core/edge devices, data pertaining to cryptographic key data, time stamp data (e.g., when mobile device entered and/or exited the transmission area(s) monitored and/or controlled by system 400), and nonce string data that pass-through engine 402 can have generated and distributed to mobile device 102. As noted above, the core/edge devices can store the data received from system 400 (pass-through engine 402) as a record of database records, wherein the record of database records can be indexed, for example, based on subscriber data associated with an SIM affiliated with mobile device 102.

System 400 (and in particular pass-through engine 402) can receive authentication data from one or more core/edge devices. The authentication data can then be directed, via pass-through engine 402, to mobile device 102. The authentication data, received from the one or more core/edge devices, can require mobile device 102 to perform additional authentication steps beyond typical SIM authentication. In accordance with aspects of the subject disclosure a core/edge device can generate, as a function of the record of database records as indexed based on subscriber data associated with mobile device 102, a challenge question(s) can regarding random periods of time (e.g., one or more timeframe t1, timeframe t2, timeframe t3, . . . ). The challenge question(s) can then be directed, by core/edge device, to system 400 (e.g., pass-through engine 402). Pass-through engine 402 can subsequently forward the challenge question(s) to mobile device 102. Responses to the challenge question(s) from mobile device 102 to the one or more core/edge devices can also be conveyed via system 400 (pass-through engine 402), whereupon the one or more core/edge devices can confirm/determine whether or not there has been any malfeasance with regard to unauthorized swapping of the SIM associated with mobile device 102.

Figure 5:
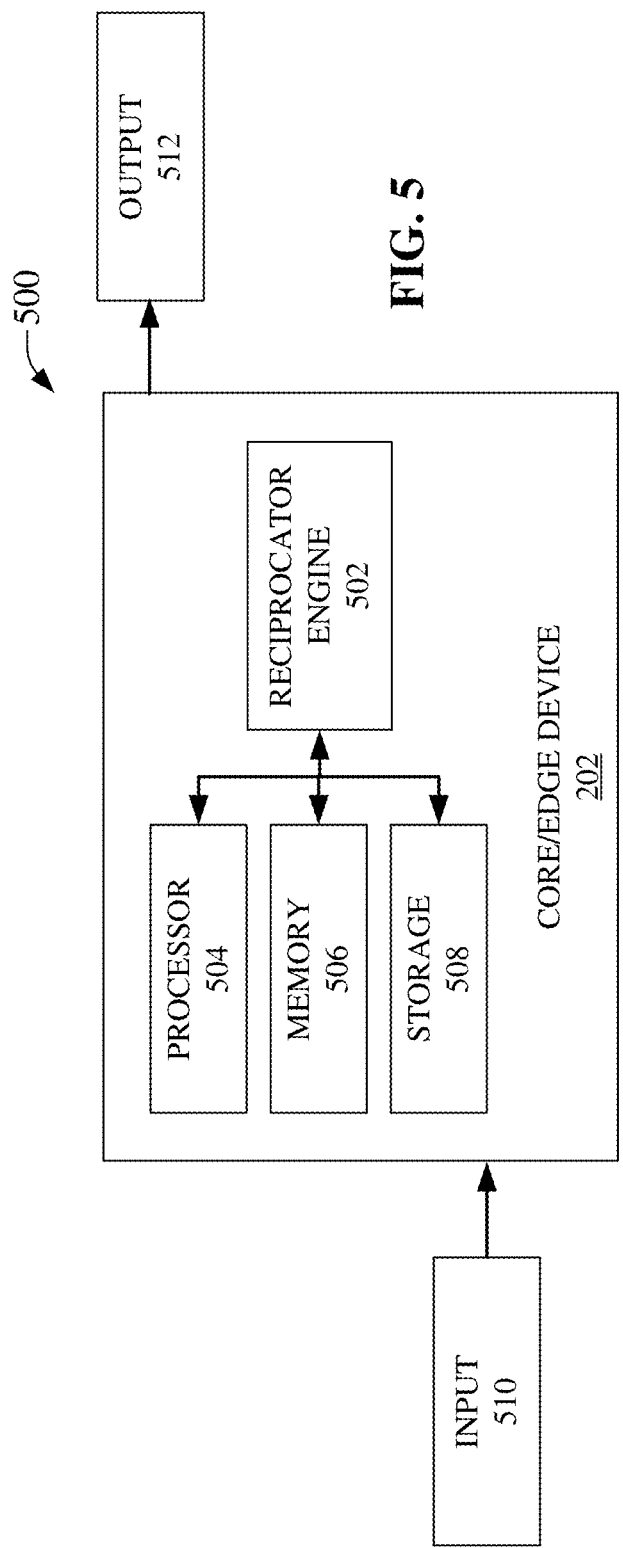
FIG. 5 illustrates another depiction of a system that counters subscriber identification module swapping fraud attacks, in accordance with aspects of the subject disclosure.

FIG. 5 provides further depiction of core/edge device 202, now labeled as system 500, for countering SIM swapping fraud attacks in accordance with yet additional embodiments. System 500 can include reciprocator engine 502 that can be communicatively coupled to processor 504, memory 506, and storage 508. Reciprocator engine 502 can be in communication with processor 504 for facilitating operation of computer or machine executable instructions and/or components by reciprocator engine 502, memory 506 for storing data and/or the computer or machine executable instructions and/or components, and storage 508 for providing longer term storage of data and/or machine and/or computer executable instructions. Additionally, system 500 can also receive input 510 for use, manipulation, and/or transformation by reciprocator engine 502 to produce one or more useful, concrete, and tangible result and/or transform one or more articles to different states or things. Further, system 500 can also generate and output the useful, concrete, and tangible result and/or the transformed one or more articles produced by pass-through engine 502 as output 512.

System 500 can be any type of mechanism, machine, device, facility, and/or instrument that includes a processor and/or is capable of effective and/or operative communication with a network topology. Mechanisms, machines, devices, facilities, and/or instruments that can comprise system 500 can include tablet computing devices, handheld devices, server class computing machines and/or databases, laptop computers, notebook computers, desktop computers, cell phones, smart phones, consumer appliances and/or instrumentation, industrial devices and/or components, personal digital assistants, multimedia Internet enabled phones, multimedia players, aeronautical/avionic devices associated with, for instance, orbiting satellites and/or associated aeronautical vehicles, and the like.

Reciprocator engine 502 can be in communication with a tower device (e.g., tower device 104A, tower device 104B, tower device 104C, . . . ) when mobile device 102 has, for example, exited (or entered) the broadcast coverage area controlled by the tower device. The tower device can send to system 500 (e.g., reciprocator engine 502) data relating to, for instance, subscriber data associated with a SIM associated with mobile device 102, location data associated with the tower device and/or location data associated with mobile device 102, nonce string data that can have been generated and supplied to mobile device 102 by the tower device, and cryptographic key data that can have been generated by the tower device and supplied to mobile device 102. As noted above, the cryptographic key data can be temporally and/or uniquely distinguishable from any other cryptographic key data since it can be generated based at least on time stamp data (and/or in combination with other pertinent data). Additionally, the tower device can also forward, to system 500, time stamp data that can indicate a time at which mobile device 102 entered (or exited) a transmission region controlled by the tower device. System 500 (e.g., reciprocator engine 502) based on the time stamp data can determine a duration during which mobile device 102 was within the transmission coverage region associated with the tower device. Additionally and/or alternatively, reciprocator engine 502 can also receive the duration data from the tower device.

In response to receiving the foregoing data reciprocator engine 502 can store the data received from the tower device pertaining to the interaction that the tower device had with mobile device 102 to a data structure—a record of database records. The record of database records can be indexed, for example, as a function the subscriber data associated with the SIM included with mobile device 102, wherein the subscriber data can have been obtained by the tower device and thereafter forwarded by the tower device 104A to reciprocator engine 502.

Reciprocator engine 502, in response to receiving data in regard to mobile device 102 from the tower device, can perform additional authentication steps beyond typical SIM authentication by challenging, via the facilities and/or functionalities provided by the tower device, mobile device 102. In accordance with one or more embodiments, reciprocator engine 502 can generate, based on a record of database records as indexed as a function of the subscriber data associated with mobile device 102, one or more challenge questions regarding random time periods (e.g., one or more of timeframe t1, timeframe t2, timeframe t3, . . . ). For instance, reciprocator engine 502 can request that mobile device 102 respond, via the present tower device with which mobile device 102 is currently in operable communication, to a query to list the successive GPS location(s) values of the one or more tower devices (e.g., tower device 104A, tower device 104B, tower device 104C) that mobile device 102 can have been in contact with within a defined or definable period of time.

Additionally and/or alternatively, reciprocator engine 502 can also request that mobile device 102, in addition to providing a list of successive GPS location(s) values for tower devices that mobile device 102 has been in communication with, provide one or more additional detail, such as the nonce string (or parts thereof) that can have been generated and transmitted by one or more tower device to mobile device 102 while mobile device 102 was within the broadcast umbrae/penumbrae of the one or more tower device. In this regard it should be noted that reciprocator engine 502 can request from mobile device 102 that mobile device 102 return an encrypted nonce string (or parts thereof), wherein the nonce string (or parts thereof) can have been generated and transmitted to mobile device 102 by a first tower device (e.g., tower device 104A) during a first duration of time (as indicated by first time stamp data received from the first tower device), and the encryption key data used by mobile device 102 to encrypt the nonce string (or parts thereof) can have been communicated to mobile device 102 by a second tower device (e.g., tower device 104B) during a second duration of time (as indicated by second time stamp data received from the second tower device).

In accordance with one or more embodiments, reciprocator engine 502 can request that mobile device 102 return a listing of GPS coordinates associated with the one or more tower device of a first grouping of tower devices that mobile device 102 has been in contact within a first definable or first defined time period. Reciprocator engine 502 can encrypt the request (e.g., for mobile device 102 to respond with a listing of GPS coordinates associated with tower devices in a first grouping of tower devices) using first encryption keys that can have been conveyed to mobile device 102 by a tower device associated with a second grouping of tower devices that mobile device 102 has been in contact within a second definable or second defined period of time. Additionally, reciprocator engine 502 can also direct, in the request to mobile device 102, mobile device 102 to encrypt any reply to the request (e.g., the listing of GPS coordinates associated with the one or more tower device of a first grouping of tower devices that mobile device 102 has been in contact within the first definable or first defined time period) using second encryption keys that can have been conveyed to mobile device 102 by a tower device associated with a third grouping of tower devices with which mobile device 102 has been in contact with in a third definable or third defined period of time.

Figure 6:
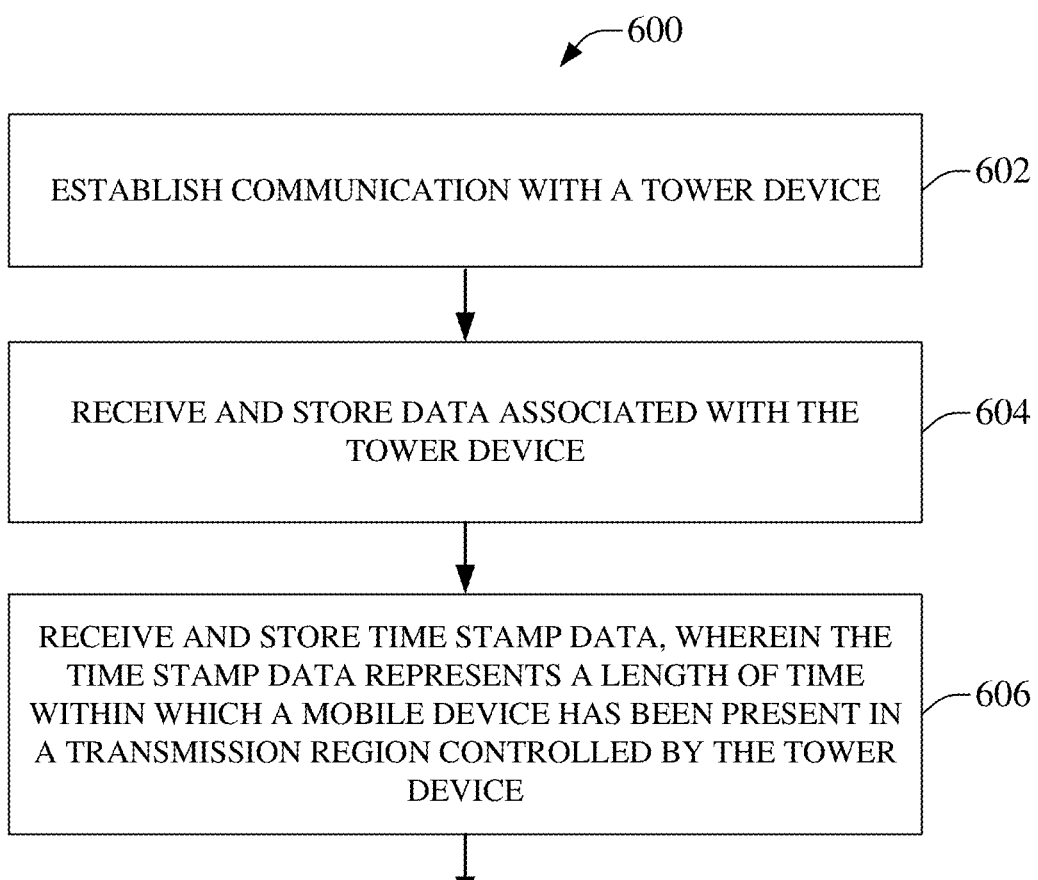
FIG. 6 provides illustration of a flow chart or method for countering subscriber identification module swapping fraud attacks, in accordance with aspects of the subject disclosure.
Figure 7:
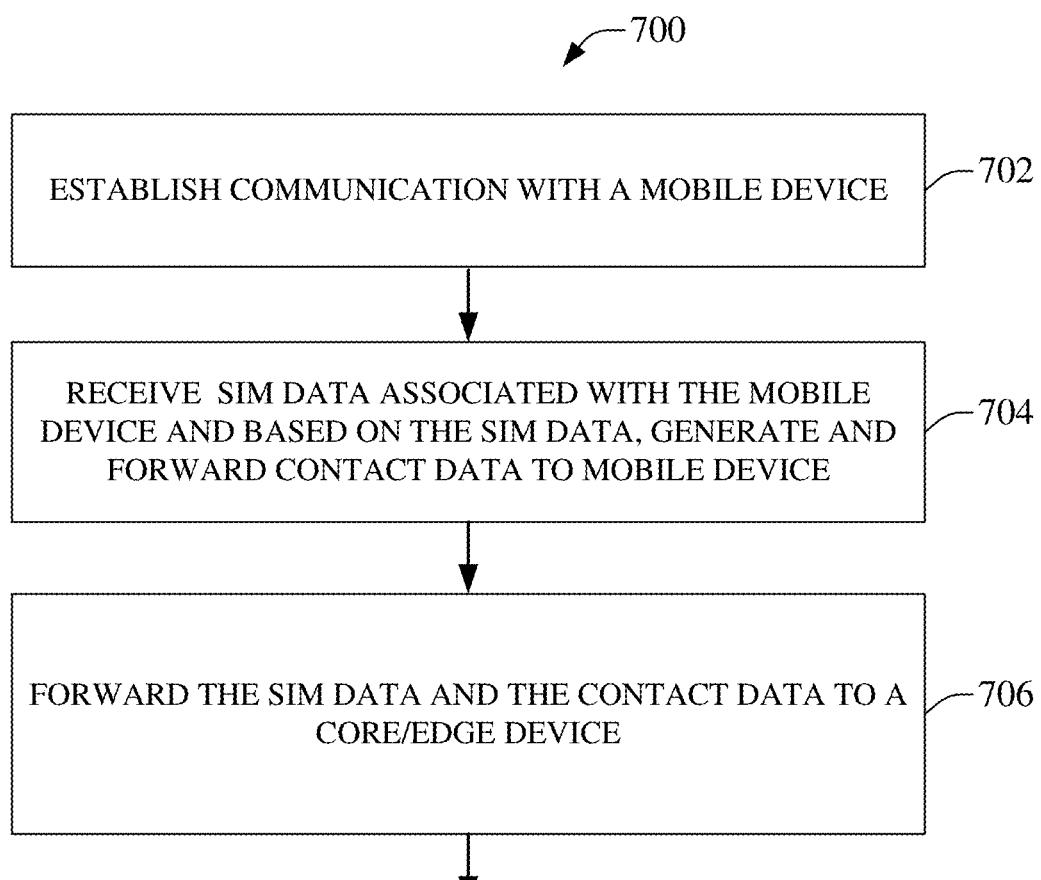
FIG. 7 provides illustration of another flow chart or method for countering subscriber identification module swapping fraud attacks, in accordance with disclosed embodiments of the subject disclosure.
Figure 8:
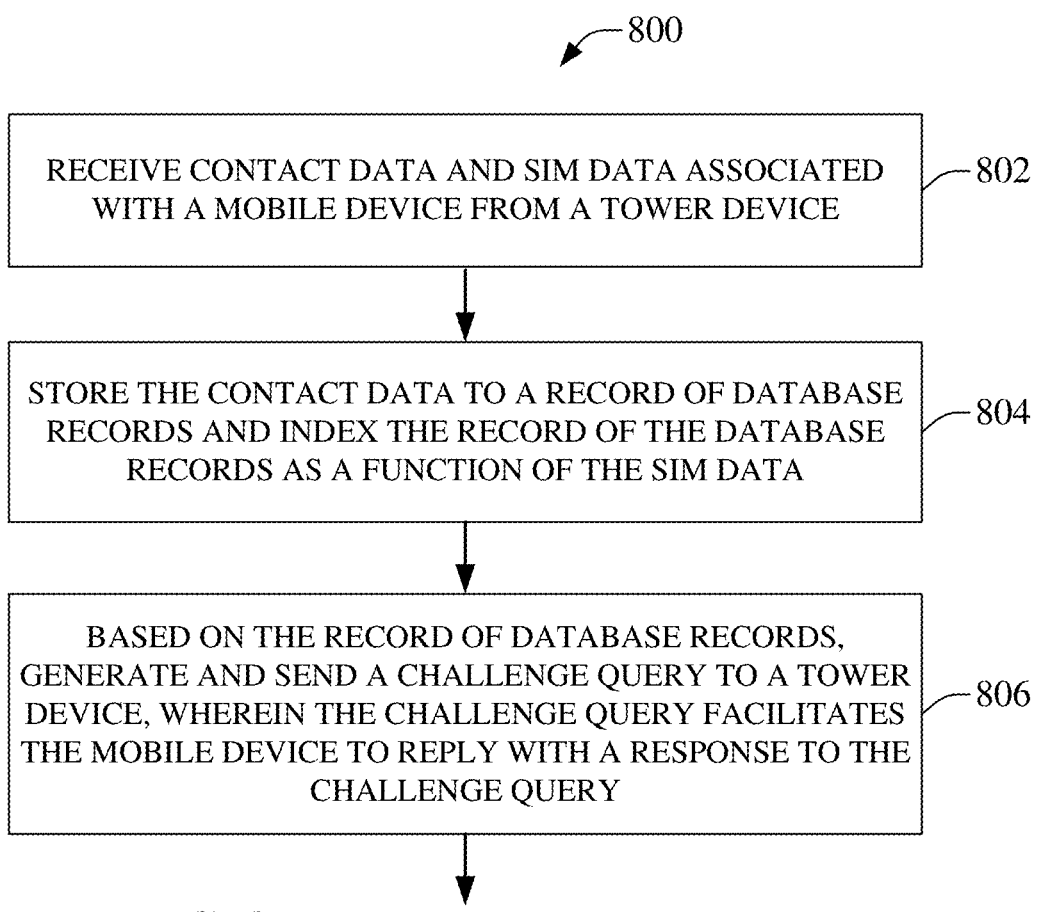
FIG. 8 provides illustration of a further flow chart or method for countering subscriber identification module swapping fraud attacks, in accordance with described embodiments of the subject disclosure.

In view of the example system(s) described above, example method(s) that can be implemented in accordance with the disclosed subject matter can be better appreciated with reference to the flowcharts in FIG. 6-8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 for countering SIM swapping fraud attacks. Method 600 can commence at act 602 wherein system 300 (e.g., authenticator engine 302) can establish communication with a tower device, such as tower device 104A. system 300 can establish communication with the tower device in response to determining that system 300 has entered/exited a broadcast/transmission area over which the tower device has control. At 604 system 300, in response to establishing communication with the tower device, can receive and store data associated with the tower device. The data associated with the tower device can include location data associated with the tower device, nonce string data that have been generated and forwarded to system 300 by the tower device, and/or cryptographic key data that system 300 can use to communicate with the tower device. At 606 system 300 can receive and store time stamp data that can be representative of a length of time that system 300 has spent within the broadcast coverage area maintained by the tower device.

FIG. 7 illustrates a method 700 for countering SIM swapping fraud attacks. Method 700 can commence at act 702 wherein system 400 (e.g., pass-through engine 402) can establish communication with a mobile device (e.g., system 300) when the mobile device enters a transmission region over which system 400 can have control. As noted above, communication between system 400 and the mobile device can be initiated when system 400 determines that the mobile device has entered a broadcast region that is being maintained by, and under the control of, system 400. At 704 system 400 can receive SIM data associated with the mobile device, and based at least on the received SIM data, system 400 can generate and forward contact data to the mobile device. The contact data that can be forwarded to mobile device can comprise, for example, location data associated with system 400, time stamp data pertaining to when the mobile device entered/exited the broadcast region over which system 400 can have control, duration data representative of a time period during which the mobile device has been tracking through the controlled broadcast region, cryptographic key data that system 400 and the mobile device can utilized during the communication session while the mobile device is tracking through the controlled broadcast region, and nonce string data that can be: generated by system 400; sent to the mobile device; and used for authentication/verification purposes during the communication session between the mobile device and system 400. At 706 system 400 can forward, and facilitate the storage of, the SIM data associated with the mobile device and/or all pertinent contact data (transaction data) in regard to the communication session between the mobile device and system 400 to a core/edge device.

FIG. 8 illustrates a further method 800 for countering SIM swapping fraud attacks. Method 800 can commence at act 802 wherein system 500 (e.g., reciprocator engine 502) in response to receiving SIM data and/or pertinent contact data associated with a transaction that can be occurring, or can have occurred, between a tower device (e.g., tower device 104A) and a mobile device (e.g., mobile device 102), at 804, can store the pertinent contact data to a record of database records and index the record of the database records as a function of the SIM data. As will be appreciated by those of skill in the art, the database records can be stored to a database device of a grouping of distributed database devices. Further, it will also be appreciated by those of skill in the art, the database records can comprise one or more transaction associated with interactions between multiple disparate mobile device and/or multiple distinguishable tower device, wherein system 500 can have dominion over at least the multiple distinguishable tower device.

At 806 system 500, based on the record of database records, can generate and send one or more challenge query to the tower device with which the mobile device is in current contemporaneous communication. The challenge query can cause the mobile device to respond with a reply to the challenge query. The reply provided by the mobile device can be used by system 500 to verify the legitimacy of the SIM that is associated with the mobile device and/or determine whether or not further service(s) should be accorded and/or provided to the mobile device.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
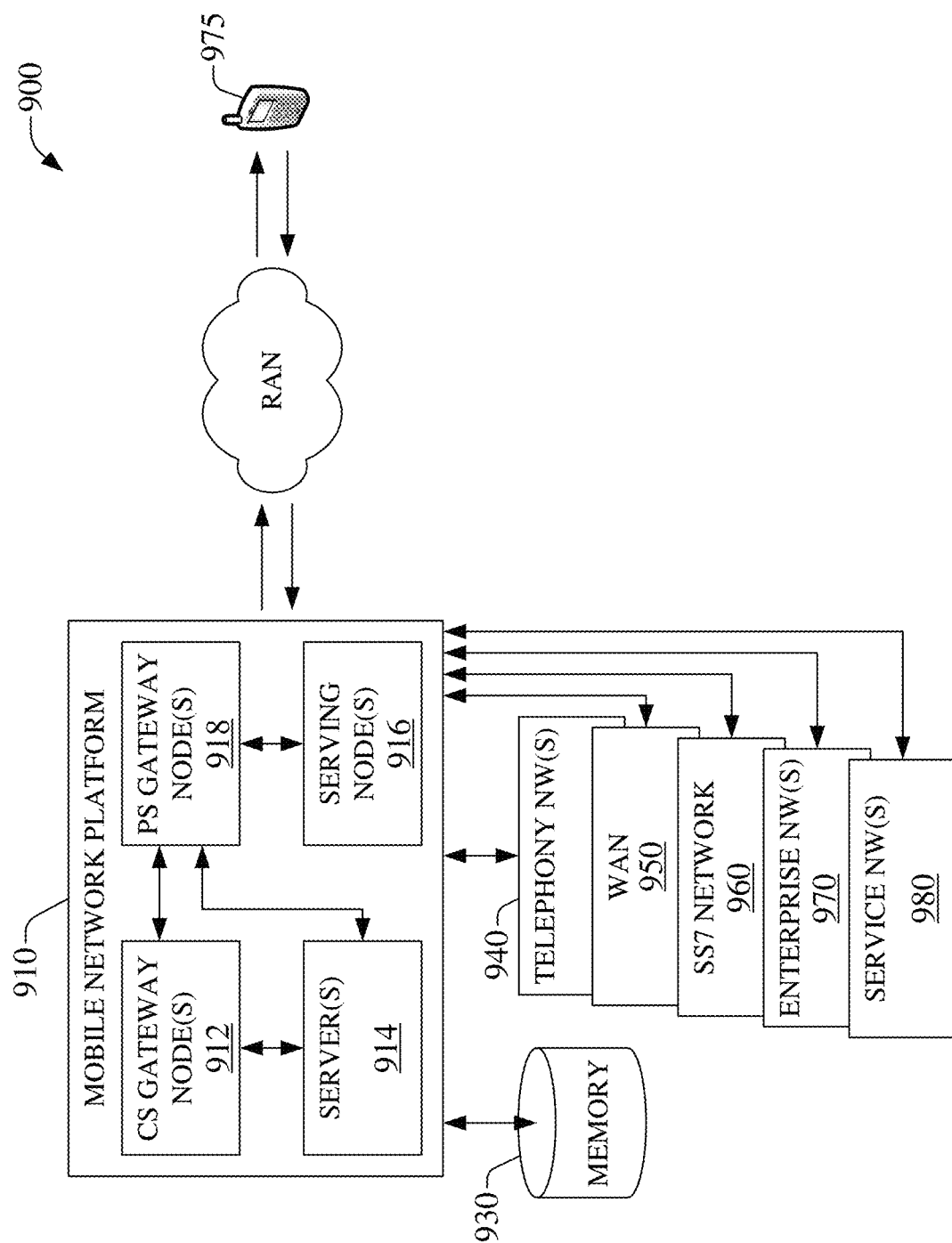
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
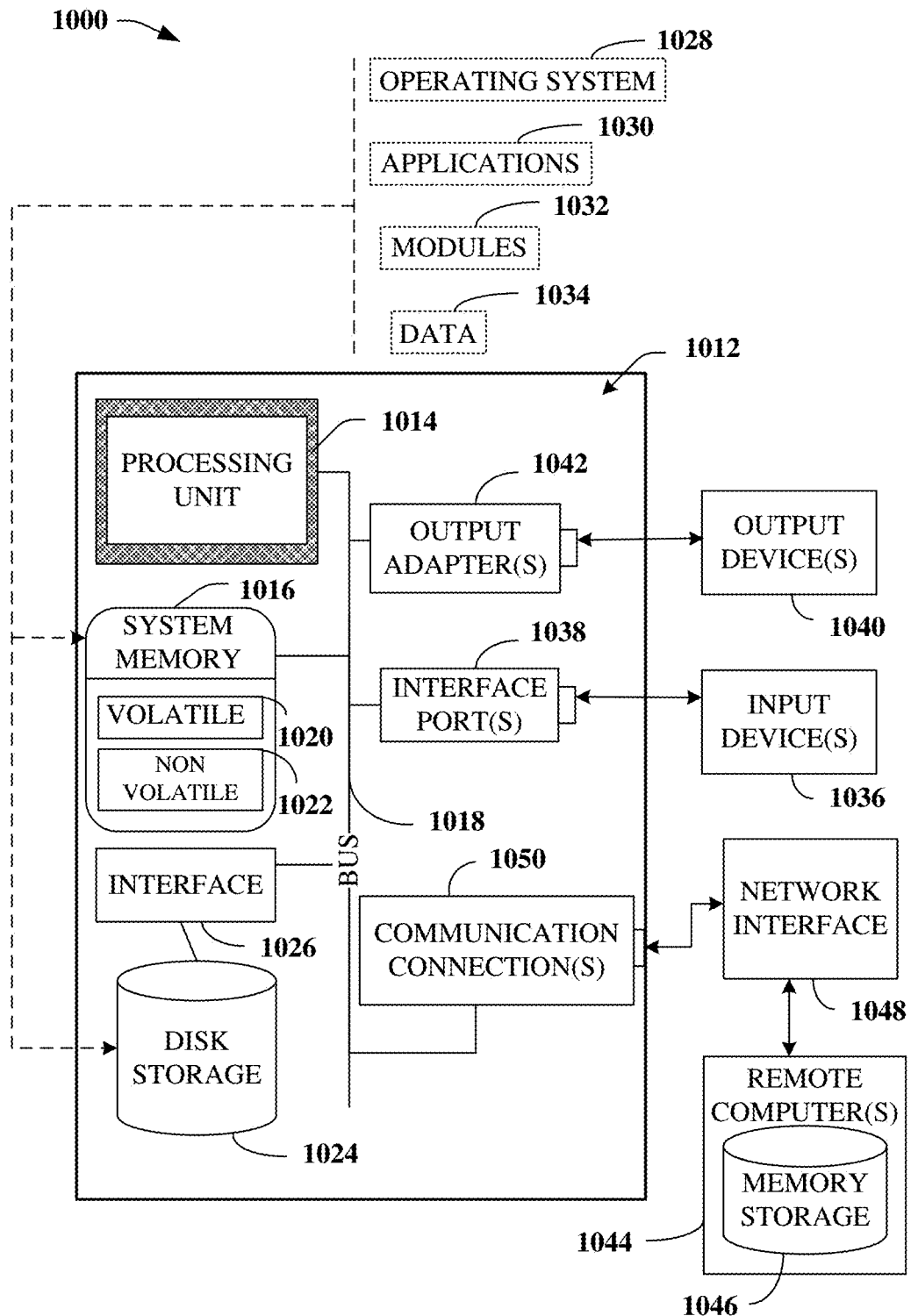
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   determining that an entry of the device into a broadcast area has occurred, the broadcast area being controlled by a first network device of a group of network devices;
   based on the entry, sending identifier data associated with a subscriber identification module representing the device to the first network device;
   facilitating a response, to be undertaken by the first network device, the response comprising location data representing a location of the first network device; and
   facilitating a second network device to generate a challenge query based on the identifier data, the location data, and timestamp data indicative of a time duration during which the device has moved through the broadcast area.

2. The device of claim 1, wherein the operations further comprise, storing the location data to a microservice associated with an operating system executing on the device.

3. The device of claim 1, wherein the response is a first response, and wherein the operations further comprise, facilitating a second response, to be undertaken by the first network device, of timestamp data representative a time duration determined as a function of the entry of the device into the broadcast area controlled by the first network device and an exit of the device from the broadcast area controlled by the first network device.

4. The device of claim 3, wherein the operations further comprise, storing the time duration to a microservice associated with an operating system executing on the device.

5. The device of claim 1, wherein the operations further comprise facilitating storing of the identifier data and the location data to the second network device.

6. The device of claim 1, wherein the operations further comprise, facilitating the second network device to send the challenge query to the device.

7. The device of claim 6, wherein the operations further comprise, responding to the challenge query with the location data and the timestamp data stored to a microservice associated with an operating system executing on the device.

8. The device of claim 1, wherein the location data is first location data and the timestamp data is first timestamp data, and the operations further comprise facilitating the first device to respond to the challenge query based on second location data and second timestamp data, and wherein the second timestamp data and the second location data are received from a tower device.

9. A method, comprising:
   detecting, by a first device comprising a processor, that a mobile device has entered a transmission area controlled by the first device;
   in response to the detecting, receiving, by the first device, identifier data associated with a subscriber identification module representing the mobile device;
   facilitating, by the first device, transmitting location data representing a location of the first device to the mobile device; and
   facilitating, by the first device, a second device to generate a challenge query based on the identifier data, the location data, and timestamp data indicative of a time duration during which the mobile device has traveled through the transmission area.

10. The method of claim 9, wherein the location data comprises global positioning satellite coordinate data.

11. The method of claim 9, wherein the first device is a network device of a grouping on network devices.

12. The method of claim 9, further comprising:
   facilitating, by the first device, storage of the identifier data and the location data to a record of database records maintained by the second device.

13. The method of claim 12, wherein the second device is a core network device of a collection of core network devices.

14. The method of claim 12, wherein the second device is an edge network device of a collection of edge network devices.

15. The method of claim 9, further comprising:
   facilitating, by the first device, the mobile device to respond to the challenge query based on the location data and the timestamp data, wherein the timestamp data and the location data have been stored to a microservice associated with an operating system executing on the mobile device.

16. The method of claim 9, wherein the location data is first location data and the timestamp data is first timestamp data, and the method further comprises facilitating, by the first device, the mobile device to respond to the challenge query based on second location data and second duration data, and wherein the second duration data and the second location data are received from a tower device.

17. A non-transitory machine-readable storage medium, comprising executable instructions that, when executed by the processor, facilitate performance of operations, comprising:
   receiving identification data representing a subscriber identification module associated with a mobile device;
   receiving location data representative of a location of a tower device of a group of tower devices;
   receiving duration data representing a time period during which the mobile device has been traversing through a transmission region monitored by the tower device;
   as a function of the identification data, the location data, and the duration data, formulating a challenge query for the mobile device to answer; and
   sending the challenge query to the tower device.

18. The non-transitory machine-readable medium of claim 17, wherein the location data is first location data and the duration data is first duration data, and the operations further comprise facilitating the mobile device to respond to the challenge query based on second location data and second duration data, and wherein the second duration data and the second location data are received from the tower device.

19. The non-transitory machine-readable medium of claim 18, wherein the operations further comprise determining whether the first duration data matches the second duration data, and whether the first location data matches the second location data.

20. The non-transitory machine-readable medium of claim 19, wherein the operations further comprise, in response to a first match of the first duration data with the second duration data and a second match of the first location data with the second location data, allowing a network service to be operational on the mobile device.

* * * * *